United States Patent Office 2,930,783
Patented Mar. 29, 1960

2,930,783

METHOD OF PURIFYING LOW-PRESSURE POLYOLEFINES

Heinrich Weber and Hermann Paul, both of Marl, Germany, and Walter Reimold, deceased, late of Stuttgart-Rohr, Germany, by Else Reimold and Gustav Reimold, heirs, Stuttgart-Rohr, Germany, assignors to Chemische Werke Huls Aktiengesellschaft, Marl, Kreis Recklinghausen, Germany, a corporation of Germany No Drawing. Application October 29, 1956
Serial No. 618,710

Claims priority, application Germany November 4, 1955

4 Claims. (Cl. 260—93.7)

The so-called low-pressure polyolefines, obtained by the polymerization of olefines such as ethylene, propylene, alpha butylene, etc., in the presence of diluting agents at comparatively low pressures and temperatures in the presence of polymerization catalysts, which are formed by reacting compounds of metals of the IV to VI sub-group of the periodic system, including thorium and uranium, with aluminum metal, alkali metals, aluminum hydride or organic compounds of aluminum, magnesium, zinc or alkali metals, present difficulties in their manipulation and use, since they generally contain compounds of the metals contained in the catalysts as impurities. It has been proposed to purify such low-pressure polyolefines by treatment with anhydrous alcohols. This method is time-consuming, however, and requires considerable amounts of these alcohols. It has been proposed also to eliminate the impurities by treating the low-pressure polyolefines with alcoholic or aqueous solutions of acids. Strong mineral acids were used which however were retained absorptively by the low-pressure polyolefines to such an extent that they could not be removed completely by prolonged washing with water. Consequently low-pressure polyolefines, purified by means of acids, have been found to attack the processing machines, tools and molds, by making them unusable in certain circumstances.

It has been found that crude low-pressure polyolefines which have been produced by low-pressure polymerization of α-olefines having from 2 to 6 carbon atoms, in the presence of a mixed catalyst as disclosed by Prof. Dr. Ziegler, said catalyst having been produced by reacting a compound of a metal of the 4th to 6th group of the periodic system including thorium, uranium, cobalt and iron with a reducing agent selected from the group consisting of aluminum, aluminum hydride, the alkali metals, and the metallo organic compounds of aluminum, magnesium, zinc and the alkali metals, in an inert solvent selected from the group consisting of the aliphatic and hydroaromatic hydrocarbons containing from 4 to 12 carbon atoms, can be purified advantageously by treating said crude low-pressure polyolefines with a liquid, organic, oxygen-containing compound in which all of the oxygen valencies are bound to carbon atoms, said compound being a member of the group consisting of ethers, aldehydes, ketones, esters and lactones, and with water and separating the low-pressure olefine from the resulting mixture.

As liquid organic oxygen-containing compounds of this type ethers, such as diethyl ether, glycol-di-methyl-ether, tetrahydrofuran, dioxan, furan and pyran and aldehydes such as acetaldehyde and butyraldehyde, and ketones such as acetone, methylethyl ketone, cyclopentanone, cyclohexanone and pyrone, and esters, such as acetic acid ethyl ester, acetic acid butylester and acetoacetic ester, and lactones such as propiolactone and butyrolactone are suitable for use. These compounds can be used separately or in mixtures with each other. The amount of these liquid, organic oxygen-containing compounds to be used depends principally on the amount and nature of the metal compounds present in the crude low-pressure polyolefine and to a minor extent on the nature of the low-pressure polyolefine which in turn depends on the polymerization conditions and on the diluting agent used. In general an amount which corresponds to a molar ratio of the liquid, organic, oxygen-containing compound to the metal compound of 1:1 will be sufficient but lesser amounts may be used. The necessary amount is best determined by a preliminary test. The amount of water used depends primarily on the amount of the polyolefine and also on the amount of diluting agent, if present, and should preferably be so selected that a thorough mixing is possible without any difficulties. In order to facilitate the mixing, a small amount of a surface-active substance can be added to the water. As surface-active substances the non-ionogenic wetting agents obtained by ethoxylation, such as the reaction product of 1 mole of lauryl alcohol with 7 moles ethylene oxide, and anion-active wetting agents, such as sodium stearate and the sodium salt of the oleic amide of methyl sarcosine, and cation-active wetting agents, such as stearyl-di-methyl-benzylammonium chloride may be used. Since these surface-active substances may be retained absorptively by the low-pressure polyolefines, it is not expedient to use wetting agents which contain the reactive groups, such as sulfonates and the sulfates.

The liquid, organic, oxygen-containing compound and the water can be added simultaneously to the crude low-pressure polyolefine. The results are generally better, however, if the liquid, organic, oxygen-containing substance is added first and the water later. One can start with the crude low-pressure polyolefine, separated from the polymerization mixture in known manner by filtering, decanting etc. In general, however, it is simpler to use the suspension of the low-pressure polyolefine and diluent produced by the polymerization process.

It is particularly advantageous to use a liquid, organic, oxygen-containing compound whose boiling point is higher than the boiling point of the diluent used in the polymerization. Such compounds are added to the suspension of the low-pressure polyolefine in diluent produced by the polymerization and the diluent is removed from the resulting mixture, for example, by spray drying, before the water is added. These higher-boiling liquid, organic oxygen-containing compounds should preferably not form azeotropic mixtures with the diluent. After the evaporation of the diluent, one obtains a mixture of the low-pressure polyolefine with liquid organic, oxygen-containing compound, from which the impurities can be eliminated easily and completely by treatment with water.

The treatment of the crude low-pressure polyolefines according to the present method is preferably effected at room or slightly increased temperature. If necessary, higher temperatures can also be used. The upper limit of temperature is generally determined by the boiling point of the diluent used in the polymerization, unless one wishes to carry out the treatment at superatmospheric pressure—which is generally not necessary—or unless one wishes to separate the diluent from the mixture obtained by the addition of the liquid, organic, oxygen-containing compounds to the low-pressure polyolefine-suspension. Likewise, the upper limit for the temperature may be determined by the boiling point of the liquid, organic, oxygen-containing compounds used.

After the treatment with liquid, organic, oxygen-containing compound, and water, the low-pressure polyolefine is separated in known manner, by filtering, decanting, centrifuging etc. It is advisable to wash it thoroughly with water after the separation, if desired, at elevated temperature. After drying, the low-pressure polyolefine is obtained as a snow-white powder, which is free of impurities.

The invention is illustrated by the following specific examples.

*Example 1*

Ethylene is introduced with stirring at a temperature of 50° C. and at atmospheric pressure into 1000 parts by weight of hexane containing the reaction products of 5 parts by weight of aluminum diisobutyl monochloride and 4.7 parts by weight of titanium tetrachloride. The introduction of ethylene is continued until a suspension is formed which contains 20% by weight of polyethylene. Then a mixture of 20 parts by weight of tetrahydrofuran and 20 parts by weight water are added, while access of oxygen is prevented by a protective atmosphere of nitrogen. After 10 minutes the mixture is filtered. The colorless polyethylene obtained is washed with water. After drying it contains less than 0.02% of ash. The filtrate separates into a colorless hexane phase and a slightly colored aqueous phase. Both the hexane and a part of the tetrahydrofuran can be recovered and used again.

*Example 2*

Ethylene is introduced with stirring at a temperature of 50° C. and at atmospheric pressure into 1000 parts by weight of isopropyl cyclohexane containing the reaction products of 5.4 parts by weight of aluminum diisobutyl monochloride and 4.7 parts by weight of titanium tetrachloride until a suspension is formed which contains 22% by weight of polyethylene. Then 20 parts by weight tetrahydrofuran are added with stirring, while access of oxygen is prevented by a protective atmosphere of nitrogen. After a duration of action of 10 minutes, 100 parts by weight of water are added and the mixture is stirred for another 10 minutes. The mixture is then filtered and the separated polyethylene washed with water. After drynig, a snow-white product is obtained which contains less than 0.005% of ash. The filtrate separates into a colorless isopropyl cyclohexane phase and a deep-blue aqueous phase.

Similar results are obtained if 20 parts by weight of acetone, methyl acetate or butyrolactone are used instead of the 20 parts by weight tetrahydrofuran.

*Example 3*

Ethylene is introduced with stirring at a temperature of 50° C. and a pressure of 6 to 10 atmospheres into 1000 parts by weight of butane containing the reaction products of 5.4 parts by weight of aluminum diisobutyl-monochloride and 4.7 parts by weight titanium tetrachloride, until a suspension is formed which contains 25% by weight of polyethylene. Then 20 parts by weight tetrahydrofuran are added, and the suspension is sprayed into a spray tower in which the polymeride and other non-volatile constituents of the suspension settle at the bottom as a fine powder while the butane is drawn off as a gas. The powder is sluiced out and mixed thoroughly with water at room temperature under a protective atmosphere of nitrogen and the resulting mixture is delivered to a centrifuge where the aqueous phase is separated. The washing process is repeated several times until the wash water is free from metal compounds. After drying, the polymeride is a snow-white powder with less than 0.005% of ash.

We claim:

1. Process for the purification of a crude low-pressure polyolefine produced by low-pressure polymerization of an $\alpha$-olefine containing from 2 to 6 carbon atoms in the presence of a catalyst formed by reacting titanium tetrachloride with an aluminiumalkylchloride the step which comprises treating said crude low-pressure polyolefine in the presence of an inert solvent selected from the group consisting of aliphatic and hydroaromatic hydrocarbons containing from 4 to 12 carbon atoms with a liquid organic cyclic ether selected from the group consisting of tetrahydrofuran, dioxan, furan and pyran, thereafter washing with water until the water is free from metal compounds and separating and drying the purified low-pressure polyolefine.

2. Process of purifying a crude low-pressure polyolefine as defined in claim 1 in which the crude low-pressure polyolefine is first mixed with the said liquid organic cyclic ether and the resulting mixture is mixed with water.

3. Process of purifying a crude low-pressure polyolefine as defined in claim 1 in which the said liquid organic cyclic ether has a higher boiling point than said inert solvent and in which the said inert solvent is separated by vaporization thereof.

4. Process of purifying a crude low-pressure polyolefine as defined in claim 1 in which a suspension of the crude low-pressure polyolefine in said inert solvent is mixed with said liquid organic cyclic ether, thereafter the said solvent is separated from the resulting mixture by vaporization and then the resulting separated mixture of the low-pressure polyolefine and the said liquid organic cyclic ether is treated with water.

References Cited in the file of this patent

UNITED STATES PATENTS

| | | |
|---|---|---|
| 2,691,647 | Field et al. | Oct. 12, 1954 |
| 2,721,189 | Anderson et al. | Oct. 18, 1955 |
| 2,827,445 | Bartolomeo et al. | Mar. 18, 1958 |
| 2,834,768 | Friedlander | May 13, 1958 |

FOREIGN PATENTS

| | | |
|---|---|---|
| 526,101 | Italy | May 14, 1955 |
| 538,782 | Belgium | Dec. 6, 1955 |
| 785,314 | Great Britain | Oct. 27, 1957 |